US011706227B2

(12) United States Patent
Faitelson et al.

(10) Patent No.: US 11,706,227 B2
(45) Date of Patent: Jul. 18, 2023

(54) SYSTEMS AND METHODS FOR PROCESSING ACCESS PERMISSION TYPE-SPECIFIC ACCESS PERMISSION REQUESTS IN AN ENTERPRISE

(71) Applicant: VARONIS SYSTEMS INC., New York, NY (US)

(72) Inventors: Yakov Faitelson, New York, NY (US); Ohad Korkus, New York, NY (US); Ophir Kretzer-Katzir, Tenafly, NJ (US); David Bass, Carmei Yoseph (IL)

(73) Assignee: VARONIS SYSTEMS INC

( * ) Notice: Subject to any disclaimer, the term of this patent is extended or adjusted under 35 U.S.C. 154(b) by 413 days.

(21) Appl. No.: 15/214,916

(22) Filed: Jul. 20, 2016

(65) Prior Publication Data

US 2018/0026989 A1   Jan. 25, 2018

(51) Int. Cl.
  *H04L 9/40*   (2022.01)
(52) U.S. Cl.
  CPC .......... *H04L 63/105* (2013.01); *H04L 63/104* (2013.01); *H04L 63/108* (2013.01)
(58) Field of Classification Search
  CPC .... H04L 63/105; H04L 63/104; H04L 63/108
  See application file for complete search history.

(56) References Cited

U.S. PATENT DOCUMENTS 5,465,387 A    11/1995  Mukherjee
7,031,984 B2    4/2006  Kawamura et al.
7,068,592 B1    6/2006  Duvaut et al.
7,606,801 B2*  10/2009  Faitelson .............. G06F 21/316
2003/0051026 A1  3/2003  Carter et al.
2004/0186809 A1  9/2004  Schlesinger et al.
2004/0249847 A1 12/2004  Wang et al.
2005/0086529 A1  4/2005  Buchsbaum (Continued)

FOREIGN PATENT DOCUMENTS

CN    1588889 A    3/2005

OTHER PUBLICATIONS

Sahadeb DE, et al; "Secure Access Control in a Multi-user Geodatabase", Available on the Internet at the URL: http://www10.qiscafe.com. 2005, 10 pages.

(Continued)

*Primary Examiner* — Christopher C Harris

(57) ABSTRACT

A system including a processor and a non-transitory, tangible computer-readable medium in which computer program instructions are stored, which instructions, when read by a computer, cause the computer to process access permission type-specific access permission requests from enterprise users in an enterprise, the system including access permission type-specific access permission request receiving functionality operable for receiving at least one request for at least one access permission type-specific access permission of at least one user to at least one data element in the enterprise, and access permission type-specific access permission request output providing functionality operable for employing information pertaining to ones of the enterprise users having similarities to the at least one user with respect to at least the access permission type-specific access permission to the data elements in order to provide an output indication of perceived appropriateness of grant of the request.

8 Claims, 6 Drawing Sheets

(56) References Cited

U.S. PATENT DOCUMENTS

| | | |
|---|---|---|
| 2005/0108206 A1 | 5/2005 | Lam et al. |
| 2005/0203881 A1 | 9/2005 | Sakamoto et al. |
| 2005/0278334 A1 | 12/2005 | Fey et al. |
| 2006/0064313 A1 | 3/2006 | Steinbarth et al. |
| 2006/0184459 A1 | 8/2006 | Parida |
| 2006/0184530 A1 | 8/2006 | Song et al. |
| 2006/0277184 A1 | 12/2006 | Faitelson et al. |
| 2007/0203872 A1 | 8/2007 | Flinn et al. |
| 2015/0350222 A1* | 12/2015 | Hashimoto ........... H04L 63/102 726/3 |
| 2016/0105409 A1* | 4/2016 | Torman ................ H04L 63/105 726/6 |
| 2017/0180292 A1* | 6/2017 | Taniguchi ............... H04L 51/14 |
| 2018/0007053 A1* | 1/2018 | Grant .................... H04L 63/101 |

OTHER PUBLICATIONS

Sara C. Madeira, et al; "Biclustering Algorithms for Biological Data Analysis: A Survey", Mar. 2004; http://www.cs.princeton.edu/courses/archive/spr05/cos598E/bib/bicluster.pdf.

Sara C. Madeira; "Clustering, Fuzzy Clustering and Biclustering: An Overview", pp. 31-53 Jun. 27, 2003.

U.S. Appl. No. 60/688,486, filed Jun. 7, 2005

USPTO AA dated Jul. 6, 2009 in connection with U.S. Appl. No. 11/258,256.

USPTO FOA dated Apr. 24, 2009 in connection with U.S. Appl. No. 11/258,256.

USPTO FOA dated Aug. 1, 2018 in connection with U.S. Appl. No. 11/258,256.

USPTO NFOA dated Feb. 12, 2008 in connection with U.S. Appl. No. 11/258,256.

USPTO NFOA dated Dec. 11, 2008 in connection wtih U.S. Appl. No. 11/258,256.

USPTO NFOA dated Sep. 7, 2007 in connection with U.S. Appl. No. 11/258,256.

USPTO NOA mailed Aug. 10, 2009 in connection with U.S. Appl. No. 11/258,256.

\* cited by examiner

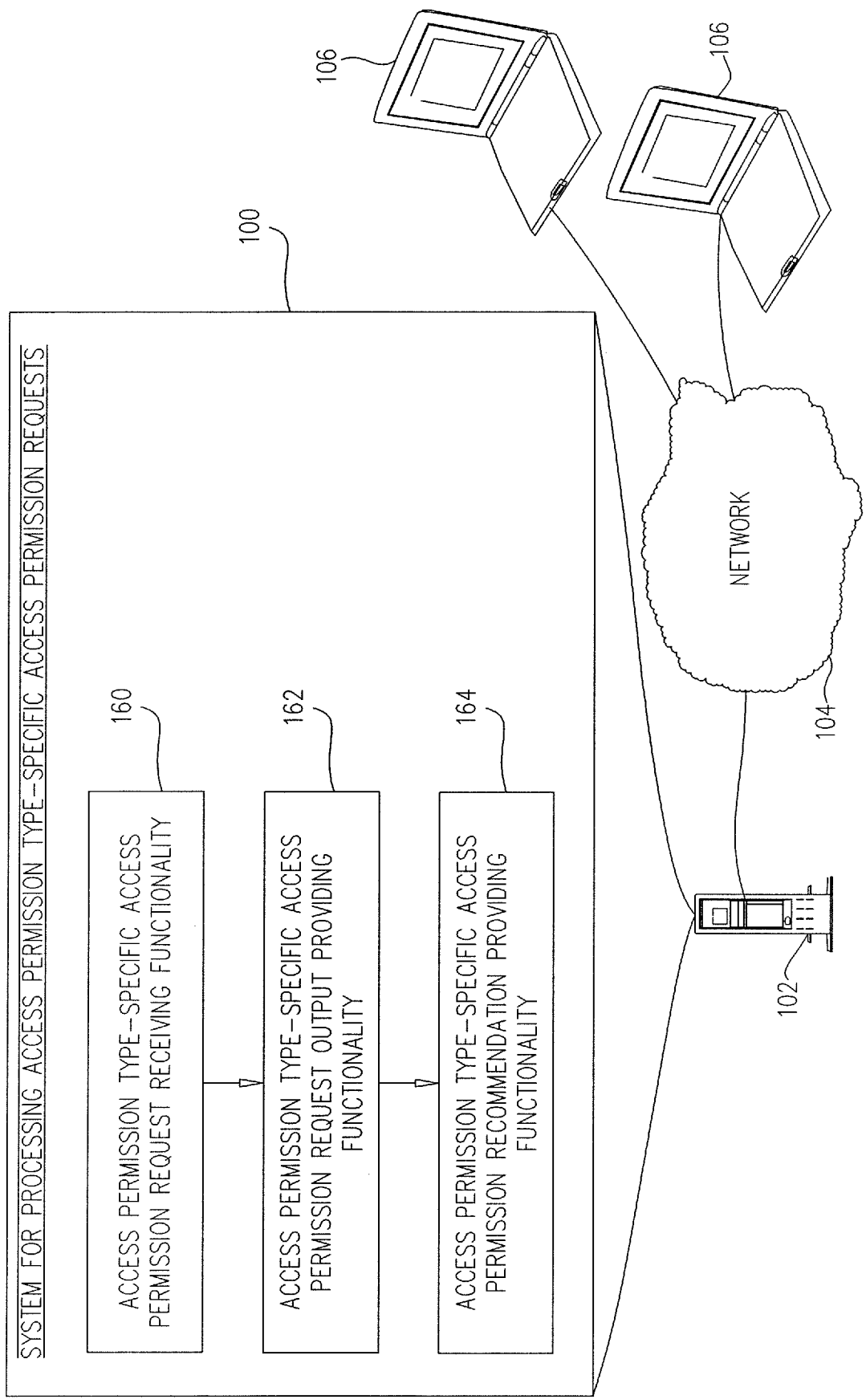

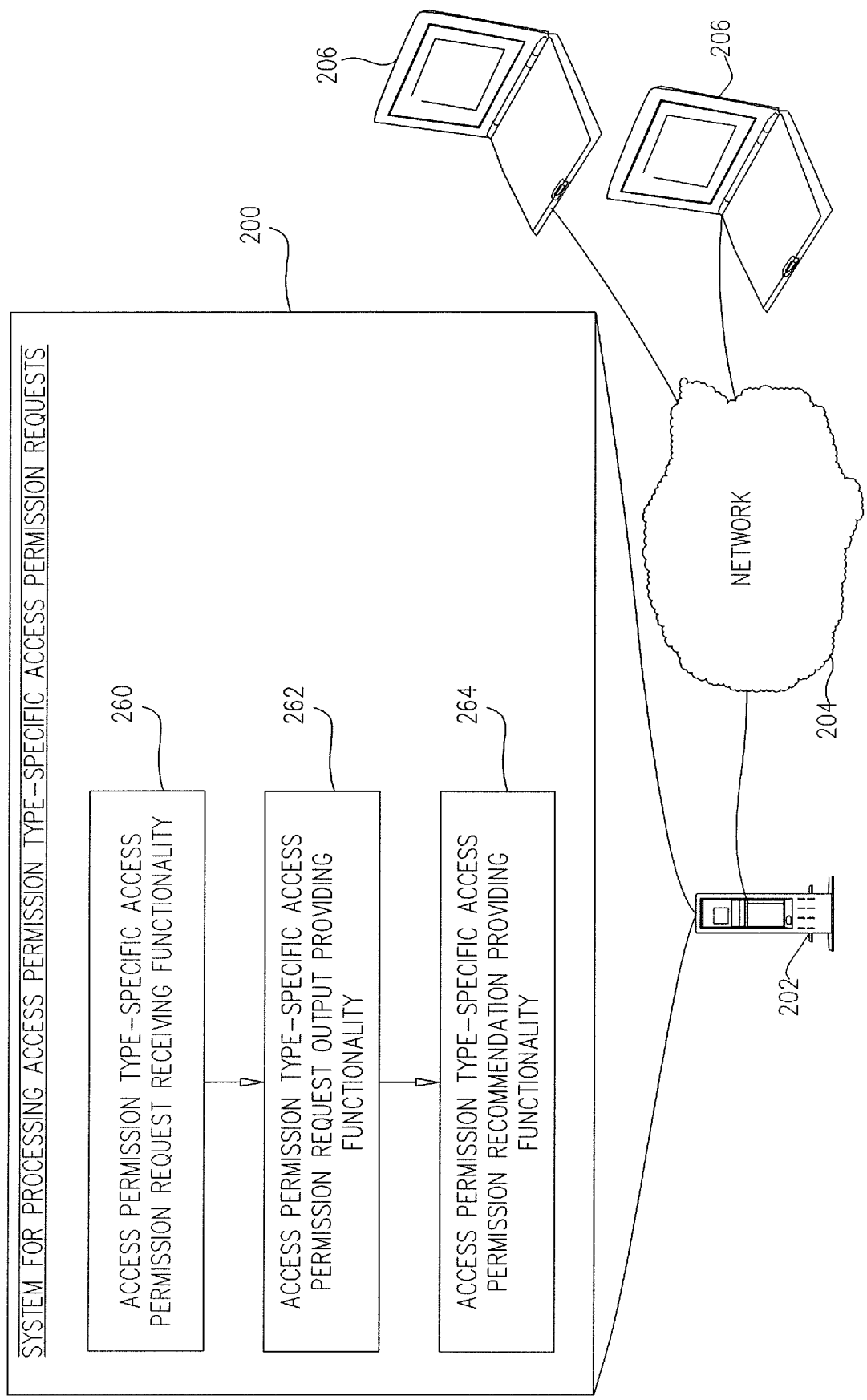

SYSTEMS AND METHODS FOR PROCESSING ACCESS PERMISSION TYPE-SPECIFIC ACCESS PERMISSION REQUESTS IN AN ENTERPRISE

REFERENCE TO RELATED APPLICATIONS

Reference is made to the following patents and patent applications, owned by assignee, the disclosures of which are hereby incorporated by reference:
U.S. Pat. No. 7,606,801.

FIELD OF THE INVENTION

The present invention relates to systems and methods for processing access permission type-specific access permission requests from enterprise users in an enterprise.

BACKGROUND OF THE INVENTION

Access permissions to data elements in an enterprise network typically need to be managed to provide suitable sufficient access permissions to enterprise data elements to individuals requiring access to the data elements and to prevent granting of unnecessary access permissions to the data elements.

SUMMARY OF THE INVENTION

The present invention provides systems and methods for processing access permission type-specific access permission requests from enterprise users in an enterprise.

There is thus provided in accordance with a preferred embodiment of the present invention a method for processing access permission type-specific access permission requests from enterprise users in an enterprise, the method including receiving at least one request for at least one access permission type-specific access permission of at least one user to at least one data element in the enterprise, and employing information pertaining to ones of the enterprise users having similarities to the at least one user with respect to at least the access permission type-specific access permission to the data elements in order to provide an output indication of perceived appropriateness of grant of the request.

Preferably, the method also includes employing the output indication to provide a recommendation to an access permission approver as to whether to at least one of approve, disapprove, approve in part, approve in an expanded form and conditionally approve the at least one request. Preferably, the recommendation to an access permission approver as to whether to at least one of approve, disapprove and conditionally approve the at least one request is based on at least one of the following conditions:

that the requesting user retains the similarity to the ones of the enterprise users;

that at least one additional access permission approver approves the request; and that the approval is limited in time.

There is also provided in accordance with another preferred embodiment of the present invention a system including a processor and a non-transitory, tangible computer-readable medium in which computer program instructions are stored, which instructions, when read by a computer, cause the computer to process access permission type-specific access permission requests from enterprise users in an enterprise, the system including access permission type-specific access permission request receiving functionality operable for receiving at least one request for at least one access permission type-specific access permission of at least one user to at least one data element in the enterprise, and access permission type-specific access permission request output providing functionality operable for employing information pertaining to ones of the enterprise users having similarities to the at least one user with respect to at least the access permission type-specific access permission to the data elements in order to provide an output indication of perceived appropriateness of grant of the request.

Preferably, the system also includes access permission type-specific access permission recommendation providing functionality operable for employing the output indication to provide a recommendation to an access permission approver as to whether to at least one of approve, disapprove, approve in part, approve in an expanded form and conditionally approve the at least one request. Preferably, the access permission type-specific access permission recommendation providing functionality is operable for employing the output indication to provide a recommendation to an access permission approver as to whether to at least one of approve, disapprove and conditionally approve the at least one request based on at least one of the following conditions:

that the requesting user retains the similarity to the ones of the enterprise users;

that at least one additional access permission approver approves the request; and that the approval is limited in time.

Preferably, the system resides on a computer server. Preferably, the computer server is connected to an enterprise network. Additionally or alternatively, the computer server is connected to the internet. Preferably, the access permission type-specific access permission request receiving functionality is operable for receiving the at least one request from a user employing a computing device communicating therewith.

There is further provided in accordance with yet another preferred embodiment of the present invention a method for processing access permission type-specific access permission requests from enterprise users in an enterprise, the method including receiving at least one request for at least one access permission type-specific access permission of at least one user to at least one data element among a multiplicity of data elements in the enterprise, and employing information pertaining to ones of the multiplicity of data elements in the enterprise having similarities to the at least one data element with respect to access permissions of at least some of the enterprise users thereto, in order to provide an output indication of perceived appropriateness of grant of the request.

Preferably, the method also includes employing the output indication to provide a recommendation to an access permission approver as to whether to at least one of approve, disapprove, approve in part, approve in an expanded form and conditionally approve the at least one request. Preferably, the recommendation to an access permission approver as to whether to at least one of approve, disapprove and conditionally approve the at least one request is based on at least one of the following conditions:

that the at least one data element retains the similarity to the ones of the multiplicity of data elements;

that at least one additional access permission approver approves the request; and that the approval is limited in time.

There is yet further provided in accordance with still another preferred embodiment of the present invention a system including a processor and a non-transitory, tangible computer-readable medium in which computer program instructions are stored, which instructions, when read by a computer, cause the computer to process access permission type-specific access permission requests from enterprise users in an enterprise, the system including access permission type-specific access permission request receiving functionality operable for receiving at least one request for at least one access permission type-specific access permission of at least one user to at least one data element among a multiplicity of data elements in the enterprise, and access permission type-specific access permission request output providing functionality operable for employing information pertaining to ones of the multiplicity of data elements in the enterprise having similarities to the at least one data element with respect to access permissions of at least some of the enterprise users thereto, in order to provide an output indication of perceived appropriateness of grant of the request.

Preferably, the system also includes access permission type-specific access permission recommendation providing functionality operable for employing the output indication to provide a recommendation to an access permission approver as to whether to at least one of approve, disapprove, approve in part, approve in an expanded form and conditionally approve the at least one request. Preferably, the access permission type-specific access permission recommendation providing functionality is operable for employing the output indication to provide a recommendation to an access permission approver as to whether to at least one of approve, disapprove and conditionally approve the at least one request includes a recommendation to conditionally approve based on at least one of the following conditions:

that the at least one data element retains the similarity to the ones of the multiplicity of data elements;

that at least one additional access permission approver approves the request; and that the approval is limited in time.

Preferably, the system resides on a computer server. Preferably, the computer server is connected to an enterprise network. Additionally or alternatively, the computer server is connected to the internet. Preferably, the access permission type-specific access permission request receiving functionality is operable for receiving the at least one request from a user employing a computing device communicating therewith.

BRIEF DESCRIPTION OF THE DRAWINGS

The present invention will be understood and appreciated more fully from the following detailed description in which:

FIG. 1C is a simplified block diagram illustration of the system of FIG. 1A;

FIG. 2C is a simplified block diagram illustration of the system of FIG. 2A.

DETAILED DESCRIPTION OF PREFERRED EMBODIMENTS

Figure 1A:
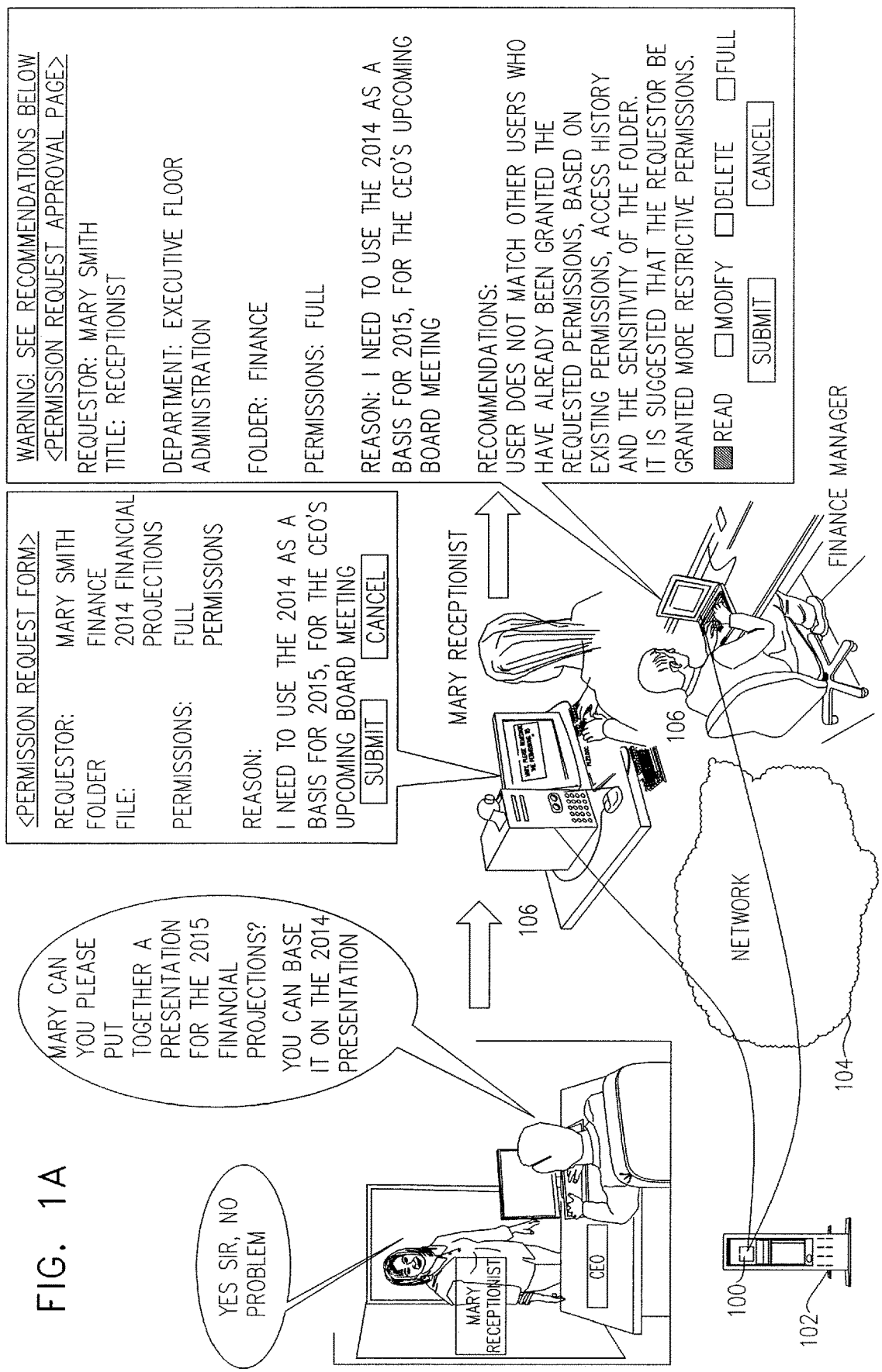
FIG. 1A is a simplified pictorial illustration of an example of the use of a system for processing access permission type-specific access permission requests from enterprise users in an enterprise, constructed and operative in accordance with a preferred embodiment of the present invention.

Reference is now made to FIG. 1A, which is a simplified pictorial illustration of one example of the use of a system for processing access permission type-specific access permission requests from enterprise users in an enterprise. The system of FIG. 1A is preferably suitable for operating in an enterprise computer network typically including multiple disparate computer hardware and software resources, and data elements such as files and folders stored on suitable storage devices.

The system of FIG. 1A is preferably operable for receiving requests for access permission type-specific access permissions of any user of a multiplicity of enterprise users to data elements in an enterprise, and for employing information pertaining to similar users of the enterprise having similarities to the user with respect to the access permission type-specific access permissions to the data elements in order to provide an output indication of perceived appropriateness of grant of the request. It is appreciated that the access permission type-specific access permissions to the data element may be, for example, read-only access permissions, write access permissions or full access permissions. It is further appreciated that the perceived appropriateness of grant of the request illustrated in FIG. 1A is preferably based on whether the user is similar to other enterprise users to whom similar access permission type-specific access permissions have been granted in the past.

The system of FIG. 1A is also preferably operable for employing the output indication to provide a recommendation to an access permission approver as to whether to at least one of approve, disapprove, approve in part, approve in an expanded form and conditionally approve the request.

It is appreciated that the recommendation is preferably based on at least one of the following conditions:

that the requesting user retains the similarity to the enterprise users;

that at least one additional access permission approver approves the request; and that the approval is limited in time.

As shown in FIG. 1A, a manager of a company requests from Mary, an employee of the company, to prepare a new version of a document, which new document is to be based on an earlier version of the document. In order to prepare the new version of the document, Mary requires access to the earlier version of the document.

To obtain access permissions to the earlier version of the document, Mary accesses the system 100 of the present application to submit a request for full access permissions to the earlier version of the document. It is appreciated that system 100 preferably resides on a suitable computing device, such as a computer server 102. Server 102 is preferably connected to at least an enterprise network 104, via which network 104 users of system 100 may access system 100 by employing any suitable computing device such as, for example, a desktop computer 106, a laptop computer, a handheld tablet or a mobile communicator device. As described hereinabove, network 104 typically connects multiple disparate computer hardware and software resources, and typically includes data elements such as files and folders stored on suitable storage devices connected thereto.

It is appreciated that server 102 may be connected to Internet, thereby facilitating access to system 100 to users employing computing devices which are not connected to enterprise network 104.

As further shown in FIG. 1A, responsive to the request received from Mary, system 100 preferably ascertains whether Mary has an actual access profile which is similar to actual access profiles of other employees of the company, which other employees have full access permissions to the document requested by Mary. It is appreciated that the similarities between the access profiles of the employees is with respect to access permission type-specific access permissions to resources of network 104, and that the similarities between access profiles of various individuals is typically indicative of the various individuals requiring similar access permissions to resources of network 104.

For the purposes of this embodiment of the present application, an actual access profile of any particular individual preferably includes information pertaining to historical actual accesses to data elements stored on enterprise network 104. The process of generating actual access profiles is described, for example, in U.S. Pat. No. 7,606,801 of the Applicant/Assignees, hereby incorporated by reference.

As yet further shown in FIG. 1A, it is a particular feature of this embodiment of the present invention that responsive to ascertaining that Mary does not have an actual access profile which is similar to actual access profiles of other employees of the company, which other employees have full access permissions to the document requested by Mary, system 100 preferably provides an output indication indicating that the request submitted by Mary for full access permissions to the earlier version of the document is inappropriate, and preferably notifies an authorized user of system 100, such as a supervisor of Mary, of the inappropriateness of the request.

It is a further particular feature of this embodiment of the present invention that system 100 also preferably provides, to the authorized user of system 100, a recommendation to approve the request in part, by granting Mary read-only access permissions to the document that she has requested. It is appreciated that read-only access permissions to the document are sufficient to allow Mary to execute the task requested by her manager, and prevent Mary from making any undesirable changes to the document.

As shown in FIG. 1A, the supervisor of Mary then proceeds to granting Mary read-only access permissions to the document that she has requested. It is appreciated that the granted read-only access permissions may be limited in time, which time should, for example, suffice for Mary to execute the task requested by her manager. It is further appreciated that the system may require at least one additional access permission approver to approve the request.

Figure 1B:
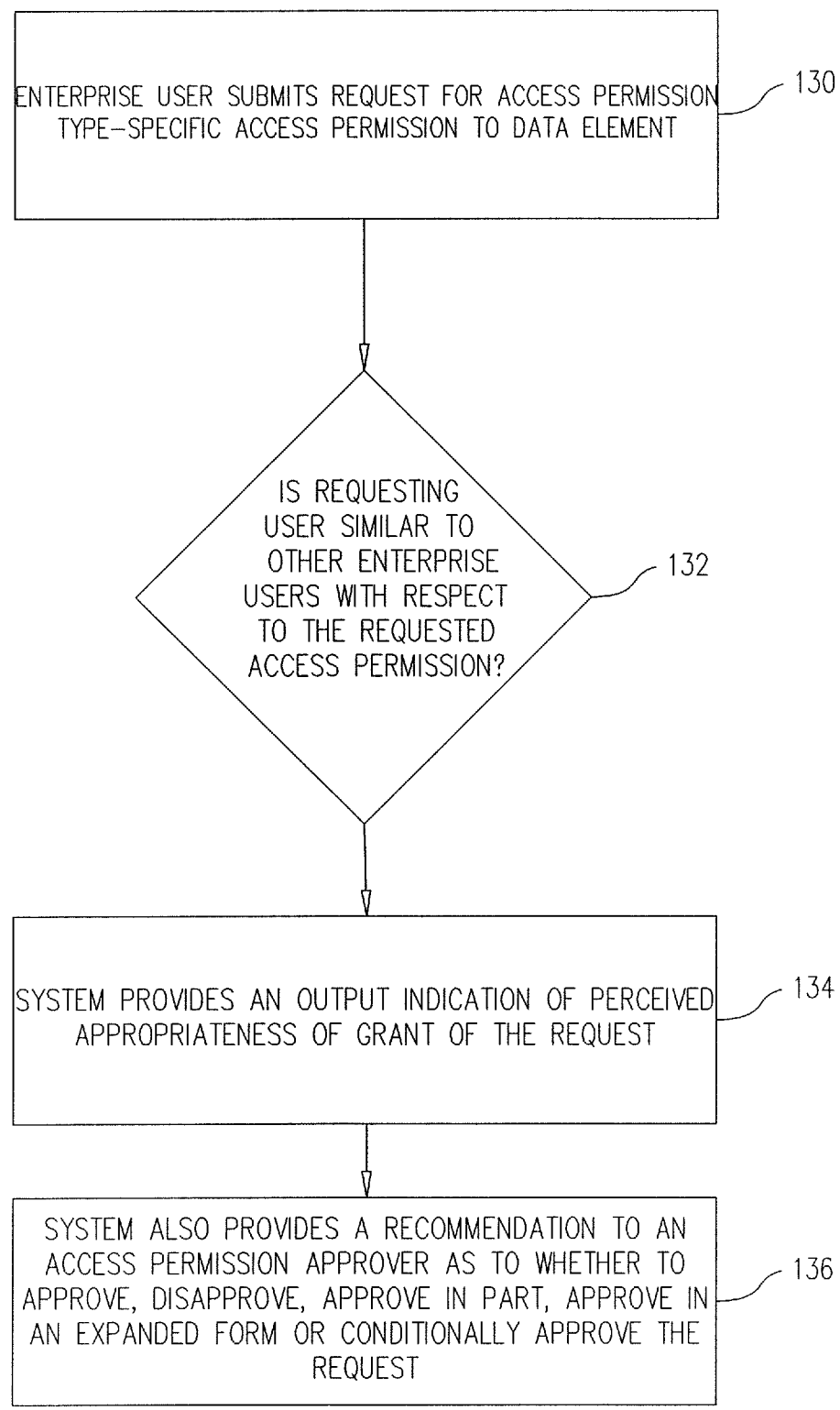
FIG. 1B is a simplified flowchart indicating steps in the operation of the system of FIG. 1A.

Reference is now made to FIG. 1B, which is a simplified flowchart indicating steps in the operation of the system of FIG. 1A.

As shown in FIG. 1B, an enterprise user initially submits a request for an access permission type-specific access permission to at least one data element in the enterprise (130). It is appreciated that the access permission type-specific access permission to the data element may be, for example, read-only access permissions, write access permissions or full access permissions.

Subsequently, the system preferably employs information pertaining to enterprise users having similarities to the enterprise user with respect to the requested access permission type-specific access permission to the file (132) in order to provide an output indication of perceived appropriateness of grant of the request (134). Preferably, the system also provides a recommendation to an access permission approver as to whether to approve, disapprove, approve in part, approve in an expanded form or conditionally approve the request (136). As described hereinabove with regard to FIG. 1A, the recommendation is preferably based on at least one of the following conditions:

that the requesting user retains the similarity to the enterprise users;

that at least one additional access permission approver approves the request; and that the approval is limited in time.

Reference is now made to FIG. 1C, which is a simplified block diagram illustration of the system 100 of FIG. 1A. As described hereinabove, system 100 preferably resides on a suitable computing device, such as a computer server 102. Computer 102 preferably comprises at least a processor and a non-transitory, tangible computer-readable medium in which computer program instructions for the operation of system 100 are stored.

Server 102 is preferably connected to at least an enterprise network 104, via which network 104 users of system 100 may access system 100 by employing any suitable computing device such as, for example, a desktop computer 106, a laptop computer, a handheld tablet or a mobile communicator device. As described hereinabove, network 104 typically connects multiple disparate computer hardware and software resources, and typically includes data elements such as files and folders stored on suitable storage devices connected thereto.

It is appreciated that server 102 may be connected to internet, thereby facilitating access to system 100 to users employing computing devices which are not connected to enterprise network 104.

As shown in FIG. 1C, system 100 of FIG. 1A preferably includes access permission type-specific access permission request receiving functionality 160 operable for receiving requests for access permission type-specific access permissions of users to data elements in an enterprise. It is appreciated that the requested access permission type-specific access permissions to the data elements may be, for example, read-only access permissions, write access permissions or full access permissions.

System 100 also preferably includes access permission type-specific access permission request output providing functionality 162 communicating with access permission type-specific access permission request receiving functionality 160 and preferably operable for employing information pertaining to enterprise users having similarities to the requesting user with respect to the access permission type-specific access permission to the data elements, in order to provide an output indication of perceived appropriateness of grant of the request.

As described hereinabove, for the purposes of this embodiment of the present application, similarities between users correspond to similarities between access profiles of the users, which are typically indicative of the users requiring similar access permissions to resources of network 104. As described hereinabove with regard to FIG. 1A, an actual access profile of any particular user preferably includes information pertaining to historical actual accesses to data elements stored on enterprise network 104. The process of generating actual access profiles is described, for example, in U.S. Pat. No. 7,606,801 of the Applicant/Assignees, hereby incorporated by reference.

System 100 also preferably includes access permission type-specific access permission recommendation providing functionality 164 operable for employing the output indication to provide a recommendation to an access permission approver as to whether to approve, disapprove, approve in part, approve in an expanded form or conditionally approve the request. The recommendation is preferably based on at least one of the following conditions:

that the requesting user retains the similarity to the enterprise users;

that at least one additional access permission approver approves the request; and that the approval is limited in time.

Figure 2A:
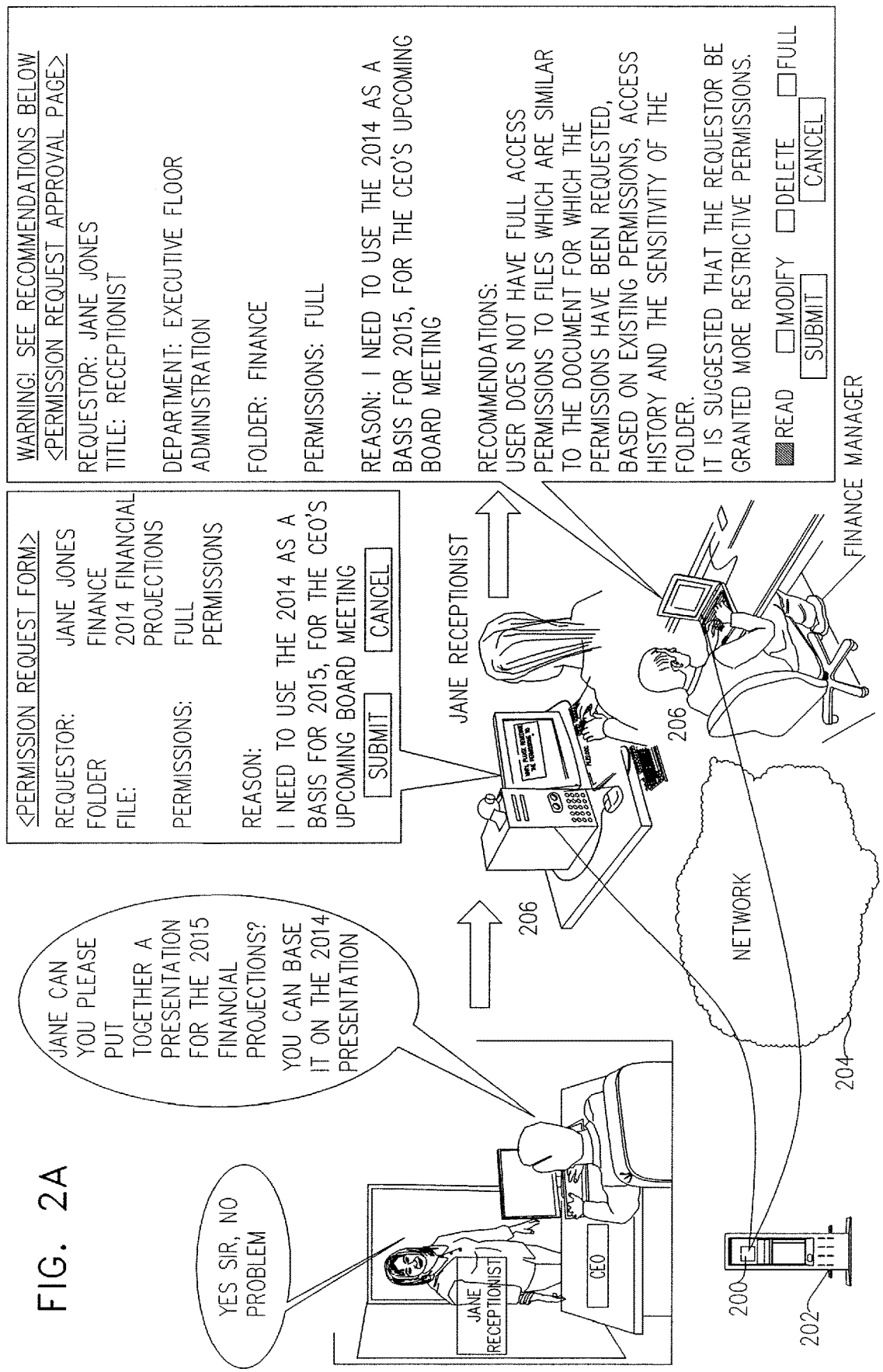
FIG. 2A is a simplified pictorial illustration of an example of the use of a system for processing access permission type-specific access permission requests from enterprise users in an enterprise, constructed and operative in accordance with another preferred embodiment of the present invention.

Reference is now made to FIG. 2A, which is a simplified pictorial illustration of an example of the use of a system for processing access permission type-specific access permission requests from enterprise users in an enterprise, constructed and operative in accordance with another preferred embodiment of the present invention. As described hereinabove with regard to FIG. 1A, the system of FIG. 2A is preferably suitable for operating in an enterprise computer network typically including multiple disparate computer hardware and software resources, and data elements such as files and folders stored on suitable storage devices.

The system of FIG. 2A is preferably operable for receiving requests for access permission type-specific access permissions of any user of a multiplicity of enterprise users to a data element among a multiplicity of data elements in the enterprise, and for employing information pertaining to the multiplicity of data elements in the enterprise having similarities to the data element with respect to access permissions of at least some of the multiplicity of enterprise users thereto, in order to provide an output indication of perceived appropriateness of grant of the request. It is appreciated that the access permission type-specific access permissions to the data element may be, for example, read-only access permissions, write access permissions or full access permissions. It is further appreciated that the perceived appropriateness of grant of the request illustrated in FIG. 2A is preferably based on whether the data element is similar to other data elements for which similar access permission type-specific access permissions have been granted to the user in the past.

The system of FIG. 2A is also preferably operable for employing the output indication to provide a recommendation to an access permission approver as to whether to at least one of approve, disapprove, approve in part, approve in an expanded form and conditionally approve the request.

It is appreciated that the recommendation is preferably based on at least one of the following conditions:

that the data element retains said similarity to said ones of said multiplicity of data elements;

that at least one additional access permission approver approves the request; and that the approval is limited in time.

As shown in FIG. 2A, a manager of a company requests from Jane, an employee of the company, to prepare a new version of a document, which new document is to be based on an earlier version of the document. In order to prepare the new version of the document, Jane requires access to the earlier version of the document.

To obtain access permissions to the earlier version of the document, Jane accesses the system 200 of the present application to submit a request for full access permissions to the earlier version of the document. It is appreciated that system 200 preferably resides on a suitable computing device, such as a computer server 202. Server 202 is preferably connected to at least an enterprise network 204, via which network 204 users of system 200 may access system 200 by employing any suitable computing device such as, for example, a desktop computer 206, a laptop computer, a handheld tablet or a mobile communicator device. As described hereinabove, network 204 typically connects multiple disparate computer hardware and software resources, and typically includes data elements such as files and folders stored on suitable storage devices connected thereto.

It is appreciated that server 202 may be connected to internet, thereby facilitating access to system 200 to users employing computing devices which are not connected to enterprise network 204.

As further shown in FIG. 2A, responsive to the request received from Jane, system 200 preferably ascertains whether Jane has full access permissions to files which are similar to the document for which Jane has requested full access permissions. It is appreciated that for the purposes of this embodiment of the present application, the similarities between the files is with respect to access permissions of at least some of the multiplicity of enterprise users thereto, and that the similarities between files is typically indicative of particular individuals requiring similar access permissions to each of the similar files. The process of ascertaining similarities between files is described, for example, in U.S. Pat. No. 7,606,801 of the Applicant/Assignees, hereby incorporated by reference.

As yet further shown in FIG. 2A, it is a particular feature of this embodiment of the present invention that responsive to ascertaining that Jane does not have full access permissions to files which are similar to the document for which Jane has requested full access permissions, system 200 preferably provides an output indication indicating that the request submitted by Jane for full access permissions to the earlier version of the document is inappropriate, and preferably notifies an authorized user of system 200, such as a supervisor of Jane, of the inappropriateness of the request.

It is a further particular feature of this embodiment of the present invention that system 200 also preferably provides, to the authorized user of system 200, a recommendation to approve the request in part, by granting Jane read-only access permissions to the document that she has requested. It is appreciated that read-only access permissions to the document are sufficient to allow Jane to execute the task requested by her manager, and prevent Jane from making any undesirable changes to the document.

As shown in FIG. 2A, the supervisor of Jane then proceeds to granting Jane read-only access permissions to the document that she has requested. It is appreciated that the granted read-only access permissions may be limited in time, which time should, for example, suffice for Jane to execute the task requested by her manager. It is further appreciated that the system may require at least one additional access permission approver to approve the request.

Figure 2B:
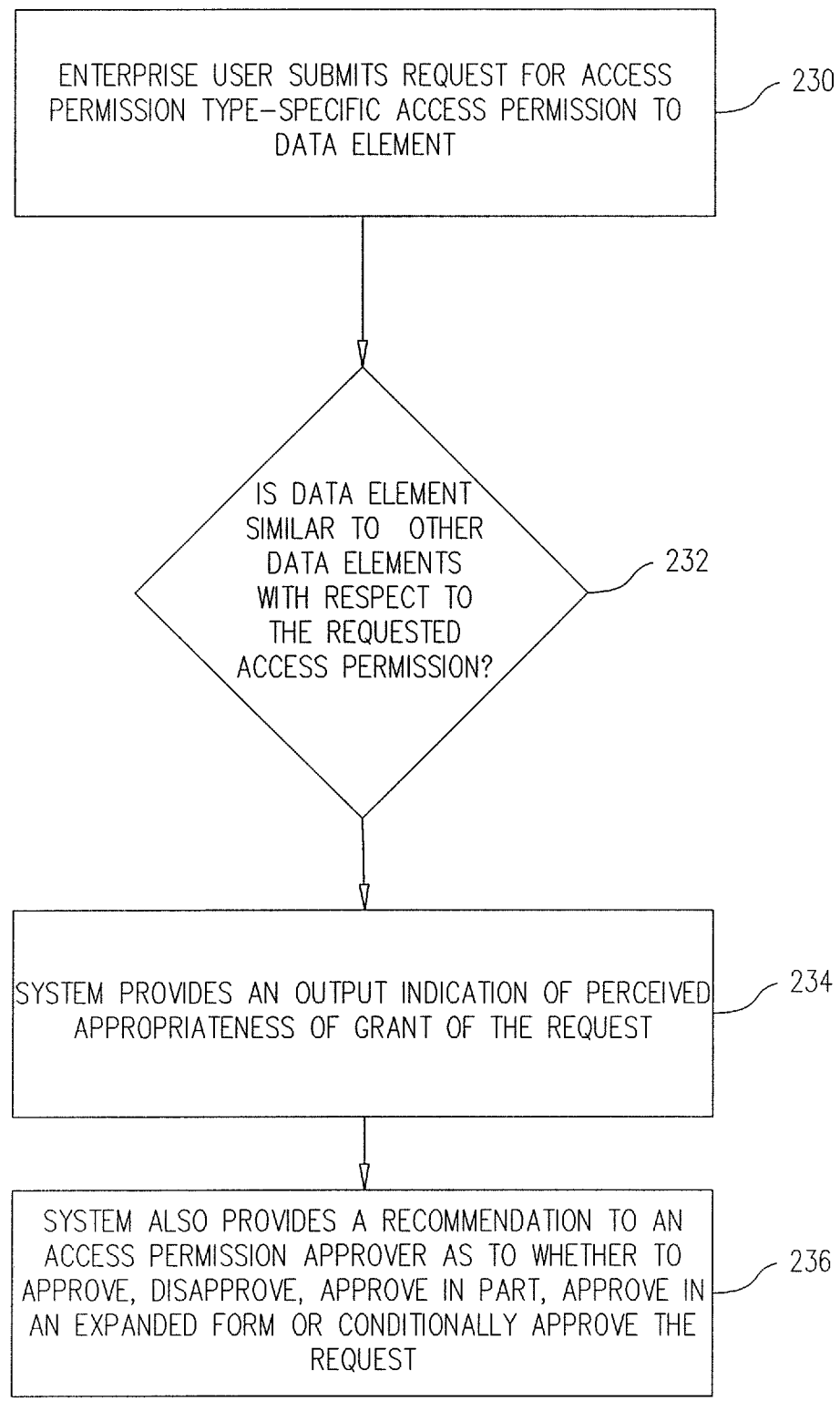
FIG. 2B is a simplified flowchart indicating steps in the operation of the system of FIG. 2A.

Reference is now made to FIG. 2B, which is a simplified flowchart indicating steps in the operation of the system of FIG. 2A.

As shown in FIG. 2B, an enterprise user initially submits a request for an access permission type-specific access permission to at least one data element in the enterprise (230). It is appreciated that the access permission type-specific access permission to the data element may be, for example, read-only access permissions, write access permissions or full access permissions.

Subsequently, the system preferably employs information pertaining to data elements having similarities to the data element with respect to the requested access permission type-specific access permissions (232) in order to provide an output indication of perceived appropriateness of grant of the request (234). Preferably, the system also provides a recommendation to an access permission approver as to whether to approve, disapprove, approve in part, approve in an expanded form or conditionally approve the request (236). As described hereinabove with regard to FIG. 2A, the recommendation is preferably based on at least one of the following conditions:

that the data element retains said similarity to said ones of said multiplicity of data elements;

that at least one additional access permission approver approves the request; and that the approval is limited in time.

Reference is now made to FIG. 2C, which is a simplified block diagram illustration of the system 200 of FIG. 2A. As described hereinabove, system 200 preferably resides on a suitable computing device, such as a computer server 202. Computer 202 preferably comprises at least a processor and a non-transitory, tangible computer-readable medium in which computer program instructions for the operation of system 200 are stored.

Server 202 is preferably connected to at least an enterprise network 204, via which network 204 users of system 200 may access system 200 by employing any suitable computing device such as, for example, a desktop computer 206, a laptop computer, a handheld tablet or a mobile communicator device. As described hereinabove, network 204 typically connects multiple disparate computer hardware and software resources, and typically includes data elements such as files and folders stored on suitable storage devices connected thereto.

It is appreciated that server 202 may be connected to internet, thereby facilitating access to system 200 to users employing computing devices which are not connected to enterprise network 204.

As shown in FIG. 2C, system 200 of FIG. 2A preferably includes access permission type-specific access permission request receiving functionality 260 operable for receiving requests for access permission type-specific access permissions of users to data elements in an enterprise. It is appreciated that the requested access permission type-specific access permissions to the data elements may be, for example, read-only access permissions, write access permissions or full access permissions.

System 200 also preferably includes access permission type-specific access permission request output providing functionality 262 communicating with access permission type-specific access permission request receiving functionality 260 and preferably operable for employing information pertaining to data elements in the enterprise having similarities to the requested data element with respect to access permissions of at least some of the enterprise users thereto, in order to provide an output indication of perceived appropriateness of grant of the request.

As described hereinabove, it is appreciated that for the purposes of this embodiment of the present application, the similarities between the files is with respect to access permissions of at least some of the multiplicity of enterprise users thereto, and that the similarities between files is typically indicative of particular individuals requiring similar access permissions to each of the similar files. The process of ascertaining similarities between files is described, for example, in U.S. Pat. No. 7,606,801 of the Applicant/Assignees, hereby incorporated by reference.

System 200 also preferably includes access permission type-specific access permission recommendation providing functionality 264 operable for employing the output indication to provide a recommendation to an access permission approver as to whether to approve, disapprove, approve in part, approve in an expanded form or conditionally approve the request. The recommendation is preferably based on at least one of the following conditions:

that the requested data element retains the similarity to the similar data elements in the enterprise that at least one additional access permission approver approves the request; and that the approval is limited in time.

It will be appreciated by persons skilled in the art that the present invention is not limited by what has been particularly shown and described hereinabove. Rather the scope of the present invention includes both combinations and sub-combinations of the various features described hereinabove as well as modifications thereof which would occur to persons skilled in the art upon reading the foregoing description and which are not in the prior art.

The invention claimed is:

1. A method for processing access permission type-specific access permission requests from enterprise users in an enterprise, the method comprising:

monitoring and recording actual access events of said enterprise users to at least one data element in said enterprise over a learning period;

creating, for each of said enterprise users, an actual access profile based on said recorded actual access events of said enterprise user to said at least one data element;

receiving, at a later time, at least one request for at least one access permission type-specific access permission of at least one enterprise user to at least one data element in said enterprise;

responsive to said receiving said at least one request for said at least one access permission type-specific access permission of said at least one enterprise user to said at least one data element in said enterprise, employing information previously stored in said actual access profiles of ones of said enterprise users having said actual access profiles which are similar to said actual access profile of said at least one enterprise user with respect to at least said access permission type-specific access permission to said data elements and information relating to a sensitivity of said at least one data element, in order to provide an output indication of perceived appropriateness of grant of said request; and employing said output indication to provide a recommendation to an access permission approver, as to whether to at least one of approve, disapprove, approve in part, approve in an expanded form and conditionally approve said at least one request, said recommendation to said access permission approver being based on all of the following conditions:

that the requesting user retains said similarity to said ones of said enterprise users;

that at least one additional access permission approver approves said request; and that said approval is limited in time.

2. A method for processing access permission type-specific access permission requests from enterprise users in an enterprise according to claim 1 and wherein said access permission approver is a manager of said at least one enterprise user.

3. A system comprising a processor and a non-transitory, tangible computer-readable medium in which computer program instructions are stored, which instructions, when read by a computer, cause the computer to process access permission type-specific access permission requests from enterprise users in an enterprise, said system comprising:

actual access events monitoring and recording functionality operable for monitoring and recording actual access events of said enterprise users to at least one data element in said enterprise over a learning period;

actual access profile creating functionality operable for creating, for each of said enterprise users, an actual access profile based on said recorded actual access events of said enterprise user to said at least one data element;

access permission type-specific access permission request receiving functionality operable for receiving, after said creating, for each of said enterprise users, an actual access profile based on said recorded actual access events of said enterprise user to said at least one data element, at least one request for at least one access permission type-specific access permission of at least one enterprise user to at least one data element in said enterprise;

access permission type-specific access permission request output providing functionality operable, responsive to said receiving said at least one request for said at least one access permission type-specific access permission of said at least one enterprise user to said at least one data element in said enterprise, for employing information previously stored in said actual access profiles of ones of said enterprise users having said actual access profiles which are similar to said actual access profile of said at least one enterprise user with respect to at least said access permission type-specific access permission to said data elements and information relating to a sensitivity of said at least one data element, in order to provide an output indication of perceived appropriateness of grant of said request; and access permission type-specific access permission recommendation providing functionality operable for employing said output indication to provide a recommendation to an access permission approver, as to whether to at least one of approve, disapprove, approve in part, approve in an expanded form and conditionally approve, said at least one request, said access permission type-specific access permission recommendation providing functionality being operable for employing said output indication to provide said recommendation based on all of the following conditions:

that the requesting user retains said similarity to said ones of said enterprise users;

that at least one additional access permission approver approves said request; and that said approval is limited in time.

4. A system for processing access permission type-specific access permission requests from enterprise users in an enterprise according to claim 3 and wherein said system resides on a computer server.

5. A system for processing access permission type-specific access permission requests from enterprise users in an enterprise according to claim 4 and wherein said computer server is connected to an enterprise network.

6. A system for processing access permission type-specific access permission requests from enterprise users in an enterprise according to claim 4 and wherein said computer server is connected to the internet.

7. A system for processing access permission type-specific access permission requests from enterprise users in an enterprise according to claim 3 and wherein said access permission type-specific access permission request receiving functionality is operable for receiving said at least one request from a user employing a computing device communicating therewith.

8. A system for processing access permission type-specific access permission requests from enterprise users in an enterprise according to claim 3 and wherein said access permission approver is a manager of said at least one enterprise user.

* * * * *